United States Patent
Ribes et al.

(10) Patent No.: US 10,315,550 B2
(45) Date of Patent: Jun. 11, 2019

(54) ACCESS FLOOR OF A MOTOR VEHICLE

(71) Applicant: CERA APS, Reims (FR)

(72) Inventors: Stéphane Ribes, Romain (FR); Carlos Martins, Tours sur Marne (FR); Benoit Philippe, Santa Cristina D'Aro—Girona (ES)

(73) Assignee: CERA APS, Reims (FR)

( * ) Notice: Subject to any disclaimer, the term of this patent is extended or adjusted under 35 U.S.C. 154(b) by 0 days.

(21) Appl. No.: 15/553,315

(22) PCT Filed: Feb. 23, 2016

(86) PCT No.: PCT/FR2016/050410
§ 371 (c)(1),
(2) Date: Aug. 24, 2017

(87) PCT Pub. No.: WO2016/135408
PCT Pub. Date: Sep. 1, 2016

(65) Prior Publication Data
US 2018/0244185 A1   Aug. 30, 2018

(30) Foreign Application Priority Data
Feb. 24, 2015   (FR) ..................... 15 51560

(51) Int. Cl.
*B60N 3/04*   (2006.01)
*B29C 45/00*  (2006.01)
(Continued)

(52) U.S. Cl.
CPC .......... *B60N 3/048* (2013.01); *B29C 45/0001* (2013.01); *B29C 45/44* (2013.01);
(Continued)

(58) Field of Classification Search
CPC ....... B60N 3/048; B60R 13/083; B60R 13/01; B60R 13/011
(Continued)

(56) References Cited

U.S. PATENT DOCUMENTS 3,488,081 A * 1/1970 Nolen .................... B60N 3/044
                                                          15/215
3,605,166 A * 9/1971 Chen ....................... A47L 23/24
                                                          15/215
(Continued)

FOREIGN PATENT DOCUMENTS

| DE | 1530494 A1 | 10/1969 |
| FR | 2737689 A1 | 2/1997  |
| FR | 2756232 A1 | 5/1998  |

OTHER PUBLICATIONS

International Search Report for PCT/FR2016/050410 dated Jun. 3, 2016.

*Primary Examiner* — Jason S Morrow
(74) *Attorney, Agent, or Firm* — Bachman & LaPointe, P.C.

(57) ABSTRACT

An access floor of a motor vehicle comprising a structural core made from injection-molded thermoplastic material, the core comprising at least one first part, the first part having a first face for receiving feet of passengers, defining a generally flat and horizontal surface, and a first rear face, defining a non-planar surface, wherein the first part comprises a network of contiguous cells defining a repetitive pattern extending along two axes, the cells being open on the reception and rear faces and delimited by partitions extending vertically, wherein two contiguous cells having at least one common portion of the partition, the core comprising an MFR fluidity in accordance with ISO 1133, greater than or equal to 50, the partitions have a thickness of between 0.6 and 1.6 mm, the thickness varying progressively so as to (Continued)

exhibit at least one undercut enabling the core to be removed from the mold.

15 Claims, 1 Drawing Sheet

(51) Int. Cl.
    *B29L 31/30*     (2006.01)
    *B29C 45/44*     (2006.01)
    *B29K 23/00*     (2006.01)
    *B29K 105/04*     (2006.01)

(52) U.S. Cl.
    CPC ...... *B29K 2023/06* (2013.01); *B29K 2023/12* (2013.01); *B29K 2105/045* (2013.01); *B29K 2995/0097* (2013.01); *B29L 2031/3017* (2013.01)

(58) Field of Classification Search
    USPC .............................................. 296/97.23, 39.1
    See application file for complete search history.

(56) References Cited

U.S. PATENT DOCUMENTS

| | | | | |
|---|---|---|---|---|
| 3,654,657 | A | * | 4/1972 | Hubel .................... B60N 3/048 |
| | | | | 15/215 |
| 2011/0250384 | A1 | * | 10/2011 | Sumi ...................... B60R 5/044 |
| | | | | 428/118 |
| 2014/0367998 | A1 | * | 12/2014 | Lavastida .............. B62D 25/20 |
| | | | | 296/193.07 |
| 2015/0145276 | A1 | * | 5/2015 | Preisler ................ B60R 13/011 |
| | | | | 296/97.23 |
| 2015/0360734 | A1 | * | 12/2015 | McKinney ................ B60R 9/02 |
| | | | | 296/180.1 |
| 2017/0225425 | A1 | * | 8/2017 | Kwon ...................... B32B 3/12 |
| 2018/0058531 | A1 | * | 3/2018 | Schaedler ................ B32B 5/18 |

* cited by examiner

ACCESS FLOOR OF A MOTOR VEHICLE

BACKGROUND

The invention relates to an access floor of a motor vehicle.

Producing an access floor of a motor vehicle is known, said access floor comprising a structural core made from injection-moulded thermoplastic material, said core comprising at least one first part, said first part having a first face for receiving the feet of the passengers, defining a generally flat and horizontal surface, and a first rear face, defining a non-planar surface.

The reception face is usually formed by the top face of a plate issuing from moulding, the reverse face usually being formed by base means in the form of feet issuing from moulding.

The base means have variable geometries and heights in order to take account of the geometry of the floor of the vehicle and the presence of various members—such as cable networks—disposed below the access floor.

The core thus formed, is in particular based on polypropylene loaded with reinforcement fibres, in particular glass, conferring it the expected bearing capacity for receiving the feet of the passengers.

Such a core generally has a large wall thickness, for example around 2 to 3 mm, because of the high viscosity of the material constituting the core, which prevents the production of partitions with a finer thickness.

The core is therefore heavy, which is prejudicial to the lightening sought for motor vehicles.

SUMMARY

The aim of the invention is to overcome this drawback, without degrading the bearing capacity of the core.

To this end, the invention proposes an access floor of a motor vehicle, said access floor comprising a structural core made from injection-moulded thermoplastic material, said core comprising at least one first part, said first part having a first face for receiving the feet of the passengers, defining a generally flat and horizontal surface, and a first rear face, defining a non-planar surface, said access floor further having the following features:

said first part, in plan view, is generally in the form of a network of contiguous cells defining a repetitive pattern extending along two axes, said cells being open on said reception and rear faces, said cells are delimited by partitions extending generally vertically, two contiguous cells having at least one common portion of partition, the material constituting said core has an MFR fluidity—measured in accordance with ISO 1133—greater than or equal to 50, and in particular between 50 and 80, said partitions generally have a thickness of between 0.6 and 1.6 mm, and particularly between 0.7 and 1.4 mm, and particularly between 0.8 and 1.2 mm, said thickness varying progressively so as to exhibit at least one undercut enabling said core to be removed from the mould.

The non-planeness of the first rear face is dictated by the geometry of the floor of the vehicle and by the presence of various members—such as networks of cables—disposed below the access floor.

Obtaining partitions of such fine thickness is made possible through the high fluidity of the material constituting the core.

And the lack of intrinsic rigidity of such thin partitions is counterbalanced by their surface density in order to confer the expected bearing capacity on the core.

When it is stated that the first part in plan view is generally in the form of a network of cells, this does not exclude the fact that it may locally have another structure, for example in a peripheral zone.

In this description, the terms for positioning in space (height, bottom, front, vertical, horizontal, etc.) are taken with reference to the access floor mounted in the vehicle.

With the arrangement proposed, a significant lightening of the core compared with those known from the prior art is achieved, this by the production of partitions of very fine thickness, the particular structure conferred on the core enabling it to have the expected bearing capacity.

BRIEF DESCRIPTION OF THE DRAWINGS

Other particularities and advantages of the invention will emerge in the following description, given with reference to the accompanying figures, in which.

DETAILED DESCRIPTION

Figure 1:
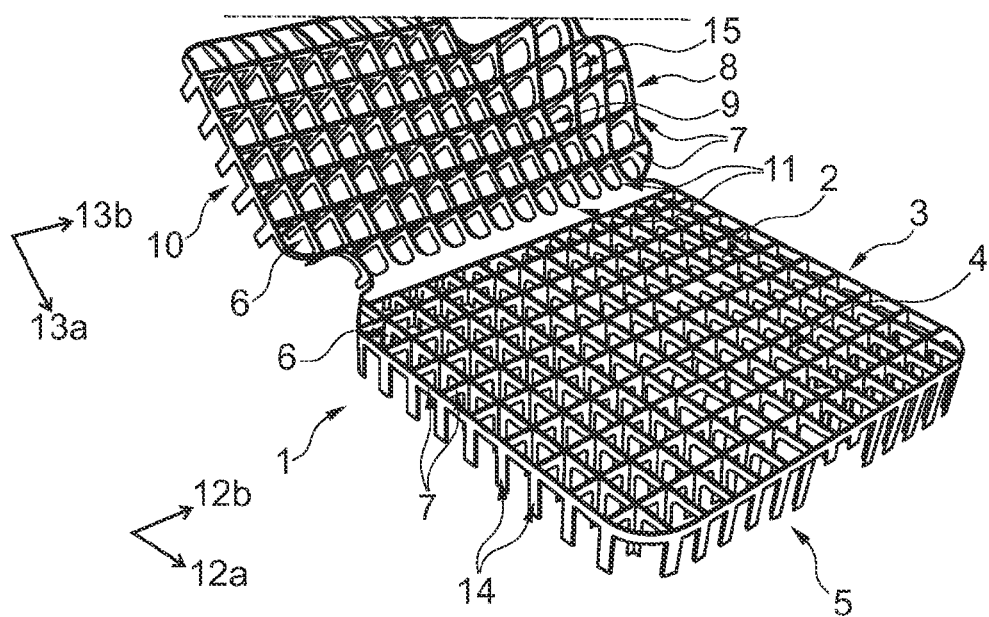
FIG. 1 is a schematic perspective representation of a false-floor core according to one embodiment.

With reference to the figures, an access floor 1 for a motor vehicle is described, said access floor comprising a structural core 2 made from injection-moulded thermoplastic material, said core comprising at least one first part 3, said first part having a first face 4 for receiving the feet of the passengers, defining a generally flat and horizontal surface, and a first rear face 5, defining a non-planar surface, said access floor further having the following features:

said first part, in plan view, is generally in the form of a network of contiguous cells 6 defining a repetitive pattern extending along two axes 12a, 12b, said cells being open on said reception and rear faces, said cells are delimited by partitions 7 extending generally vertically, two contiguous cells 6 having at least one common portion of partition 7, the material constituting said core has an MFR fluidity—measured in accordance with ISO 1133—greater than or equal to 50, and in particular between 50 and 80, said partitions generally have a thickness of between 0.6 and 1.6 mm, and particularly between 0.7 and 1.4 mm, and particularly between 0.8 and 1.2 mm, said thickness varying progressively so as to exhibit at least one undercut enabling said core to be removed from the mould.

Figure 2A:
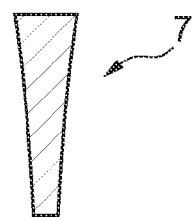
FIGS. 2a and 2b are schematic views in partial cross-section of the core in FIG. 1, perpendicular to a reception face, according to a first (2a) and second (2b) embodiment of the partitions.

According to the embodiment in FIG. 2a, the partitions 7 are provided with a single undercut, related to the positioning of the parting face of the mould at the end of said partitions, such embodiment being in particular suitable when the core has a small thickness, for example around 40 mm.

Figure 2B:
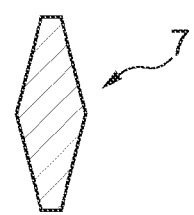

According to the embodiment in FIG. 2b, the partitions 7 are provided with a double undercut, related to the positioning of the parting face of the mould in the middle part of said partitions, such an embodiment being in particular suitable when the core has a greater thickness, for example around 60 mm.

According to the embodiment depicted, the core 2 further comprises a second part 8 disposed in front of the first part 3, said second part having a second face 9 for receiving the feet of the passengers, defining a generally planar and horizontal surface, and a second rear face 10, defining a non-planar surface, said access floor further having the following features:

said second part, in plan view, is generally in the form of a network of contiguous cells 6 defining a repetitive pattern extending along two axes 13a, 13b, said cells being open on said reception and rear faces, said cells are delimited by partitions 7 extending generally vertically, two contiguous cells 6 having at least one common portion of partition 7, said partitions generally have a thickness of between 0.6 and 1.6 mm, and particularly between 0.7 and 1.4 mm, and particularly between 0.8 and 1.2 mm, said thickness varying progressively so as to exhibit at least one undercut enabling said core to be removed from the mould.

According to one embodiment, the cells 6 of one or other or both of the parts 3, 8 are free from filling material, so as to create a layer of air subdivided by the partitions 7.

According to a variant, the cells 6 of one or other or both of the parts 3, 8 may be completely or partially filled with a porous material, for example in the form of foam, so as to achieve sound absorption in said material.

According to the embodiment shown, the first part 3 is connected to the second part 8 by at least one bridge 11 of flexible material—in this case a plurality in the embodiment depicted—forming a flexible hinge intended in particular to facilitate the moulding and/or assembly and/or stacking of the access floor 1 with a view to transport thereof.

According to one embodiment, the cells 6 of at least one of the parts 3, 8—and in particular of both parts 3, 8—extend along the two axes 12a, 12b, 13a, 13b at a maximum pitch of 50 mm, and in particular at a maximum pitch of 30 mm.

The choice of such a small pitch leads to a high surface density of cells 6 that makes it possible to ensure the expected bearing capacity for the core 2, and this despite the small thickness of the partitions 7.

According to the embodiment depicted, the two axes 12a, 12b, 13a, 13b in which the cells 6 of at least one of the parts 3, 8 extend—in this case of the two parts 3, 8 in the embodiment depicted—are perpendicular.

According to the embodiment depicted, the cell pattern 6 of at least one of the parts 3, 8—in this case the two parts 3, 8 in the embodiment depicted—is a square.

In a variant that is not shown, the pattern may be a hexagon or any other geometric pattern able to be repeated along two axes 12a, 12b, 13a, 13b.

According to the embodiment depicted, the partitions 7 of at least one of the parts 3, 8—in this case of the two parts 3, 8 in the embodiment depicted—are extended downwards by base lugs 14 issuing from moulding, said lugs having a thickness similar to that of said partitions, said lugs having a variable height.

The variable height of the lugs 14 is dictated by the geometry of the floor of the vehicle and by the presence of various members—such as networks of cables—disposed below the access floor 1.

The presence of a tight network of lugs 14 makes it possible to satisfy the bearing-capacity constraints expected for the core 2.

According to the embodiment shown, the two parts 3, 8 generally have similar cells 6.

According to one embodiment, the material constituting the core 2 is based on polyolefin, in particular polypropylene and/or polyethylene.

According to one embodiment, the material constituting the core 2 is devoid of reinforcement fibres, such as glass fibres, which makes it possible to obtain the expected fluidity for said material.

According to one embodiment, the core 2 has overall—that is to say taking account of the lugs 14 where applicable—a height—corresponding in this case to a thickness measured in a distance perpendicular to the first 4 (and optionally second 9) reception plates—of between 30 and 70 mm, and in particular 40 and 60 mm.

The walls 7 for their part may have in particular a height of between 7 and 25 mm, and more particularly between 10 and 20 mm, knowing that the greater the height of the wall 7, the better the bearing capacity of the core.

According to the embodiment depicted, the second part 8 comprises an energy absorption zone 15—intended to damp the impact of the feet of the passengers in an accident situation, the energy absorption taking place by destruction of the structure of the core 2, said zone being arranged to have a smaller resistance to pressing in faced with a pressing-in force applied perpendicular to the second reception face 9.

The absorption zone 15 has for example, in a way that is not shown, incipient ruptures or folds issuing from moulding.

Such an arrangement makes it possible in particular to dispense with blocks of expanded polystyrene or polypropylene normally used for effecting energy absorption.

According to the embodiment shown, the access floor 1 further comprises at least one acoustic protection layer, not shown, in particular in the form of elastically compressible foam or of felt, disposed below and/or above the core 2.

According to one embodiment, the access floor 1 further comprises a covering layer, not shown, disposed above the core 2 so as to receive the feet of the passengers.

The invention claimed is:

1. An access floor of a motor vehicle, said access floor comprising:

a structural core made from injection-moulded thermoplastic material, said core comprising at least one first part, said first part having a first face for receiving feet of passengers, defining a generally flat and horizontal surface, and a first rear face, defining a non-planar surface, wherein said first part, in plan view, comprises a network of contiguous cells defining a repetitive pattern extending along two axes, said cells being open on said reception and rear faces, said cells are delimited by partitions extending vertically, wherein two contiguous cells have at least one common portion of the partition, said core has an MFR fluidity in accordance with ISO 1133:2011, greater than or equal to 50, said partitions have a thickness of between 0.6 and 1.6 mm, said thickness varying progressively so as to exhibit at least one undercut enabling said core to be removed from the mould.

2. The access floor according to claim 1, wherein the core further comprises a second part disposed in front of the first part, said second part having a second face for receiving the feet of the passengers, defining a generally planar and horizontal surface, and a second rear face, defining a non-planar surface, said access floor further comprising:

said second part, in plan view, is in the form of a network of contiguous cells defining a repetitive pattern extending along two axes, said cells being open on said reception and rear faces, said cells are delimited by second part partitions extending vertically, two contiguous cells having at least one common portion of the second part partition, said second part partitions have a thickness of between 0.6 and 1.6 mm, said thickness varying progressively so as to exhibit at least one undercut enabling said core to be removed from the mould.

3. The access floor according to claim 2, wherein the first part is connected to the second part by at least one bridge of flexible material forming a flexible hinge configured to facilitate at least one of moulding, assembly and stacking of said access floor.

4. The access floor according to claim 1, wherein the cells of at least one of the parts extend along the two axes at a maximum pitch of 50 mm.

5. The access floor according to claim 2, wherein the two axes, in which the cells of at least one of the parts extend, are perpendicular.

6. The access floor according to claim 2, wherein the cell pattern of at least one of the parts is a square.

7. The access floor according to claim 2, wherein the partitions of at least one of the parts are extended downwards by base lugs issuing from moulding, said lugs having a thickness similar to those of said partitions, said lugs having a variable height.

8. The access floor according to claim 1, wherein the material constituting the structural core is devoid of reinforcement fibres.

9. The access floor according to claim 2, wherein the second part comprises an energy absorption zone, said zone being arranged so as to have a lower resistance to being pressing in responsive to a pressing-in force applied perpendicular to the second reception face.

10. The access floor according to claim 1, wherein said partitions have a thickness of from between 0.7 and 1.4 mm.

11. The access floor according to claim 1, wherein said partitions have a thickness of from between 0.8 and 1.2 mm.

12. The access floor according to claim 1, wherein the material constituting said core has an MFR fluidity in accordance with ISO 1133:2011, between 50 and 80.

13. The access floor according to claim 2, wherein said second part partitions have a thickness of between 0.7 and 1.4 mm.

14. The access floor according to claim 2, wherein said second part partitions have a thickness of between 0.8 and 1.2 mm.

15. The access floor according to claim 2, wherein the cells of at least one of the parts extend along the two axes at a maximum pitch of 30 mm.

* * * * *